Jan. 25, 1966  H. R. CRAVEN ETAL  3,231,129
STAGGERED STACK VENDING MACHINE
Filed April 1, 1963  7 Sheets-Sheet 1
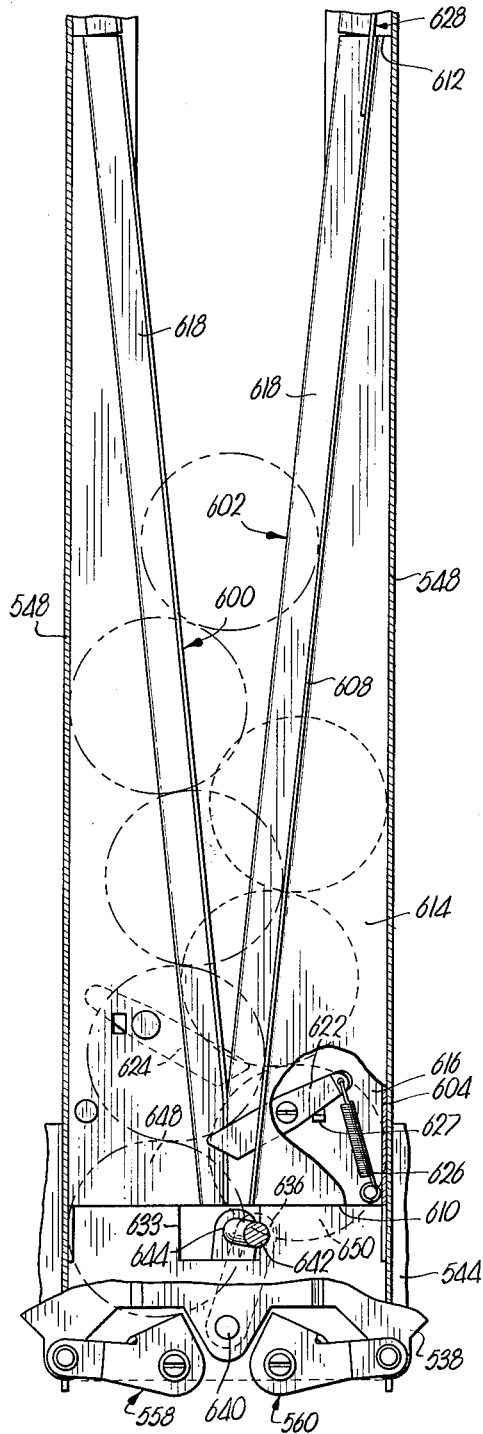
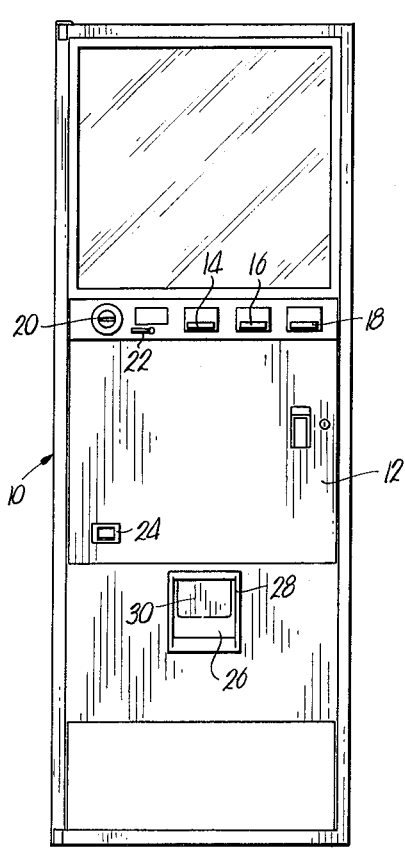
Fig.1.
Fig.9.
INVENTORS.
Herman R. Craven
BY Gerald C. Coker
Karl D. Fastner
ATTORNEYS.

Jan. 25, 1966 H. R. CRAVEN ETAL 3,231,129
STAGGERED STACK VENDING MACHINE
Filed April 1, 1963 7 Sheets-Sheet 3

INVENTORS.
Herman R. Craven
BY Gerald C. Coker
Karl D. Fastner

ATTORNEYS.

Jan. 25, 1966    H. R. CRAVEN ETAL    3,231,129
STAGGERED STACK VENDING MACHINE
Filed April 1, 1963    7 Sheets-Sheet 4
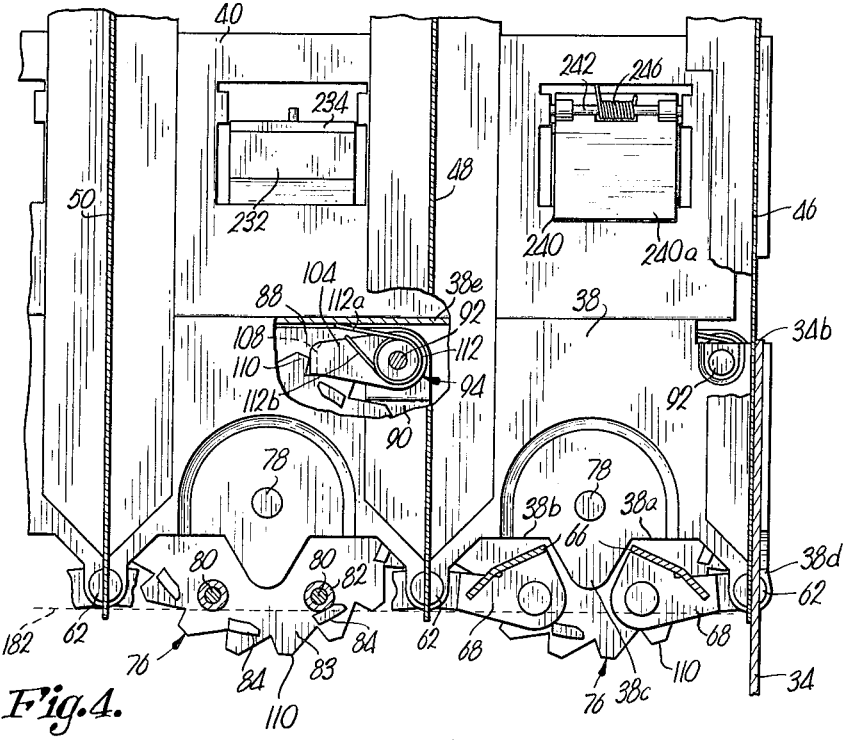
Fig.4.
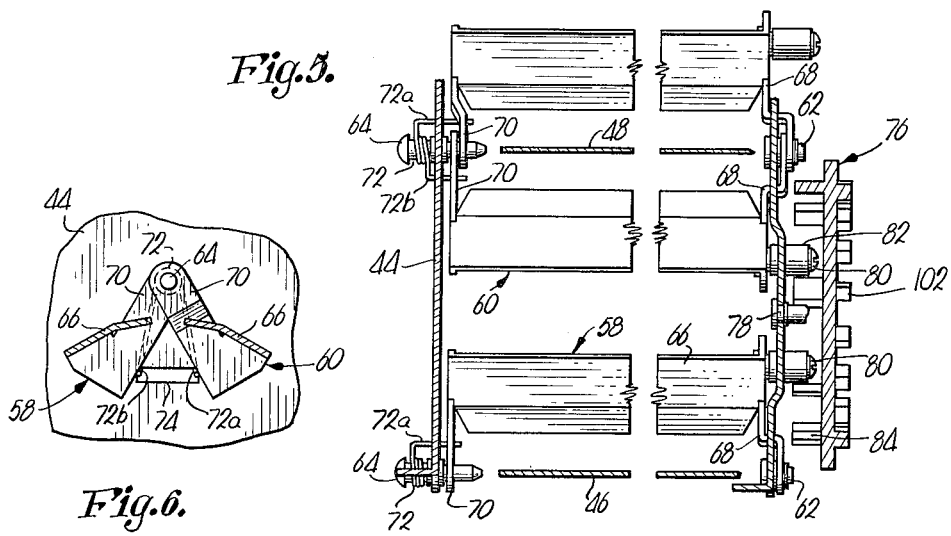
Fig.5.
Fig.6.
INVENTORS.
Herman R. Craven
BY Gerald C. Coker
Karl D. Fastner
Hovey, Schmidt, Johnson & Hovey.
ATTORNEYS.

INVENTORS.
Herman R. Craven
Gerald C. Coker
Karl D. Fastner

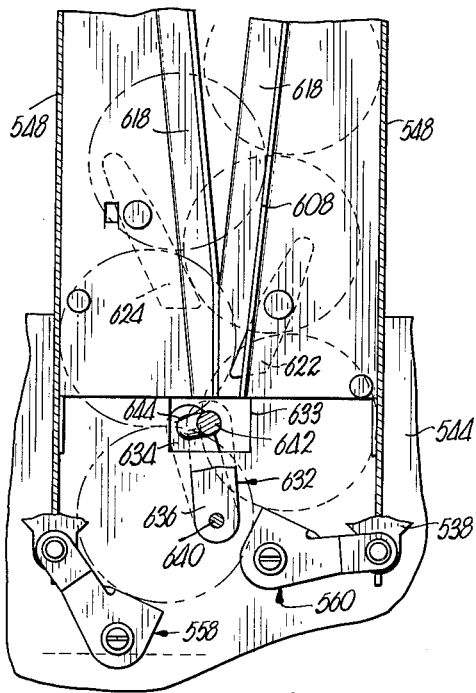
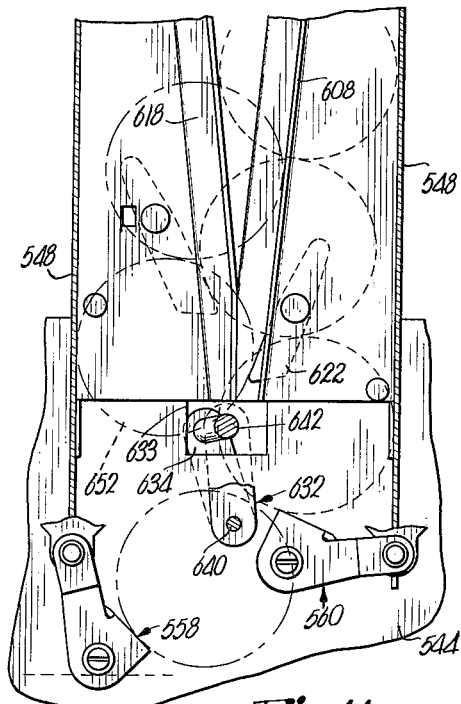
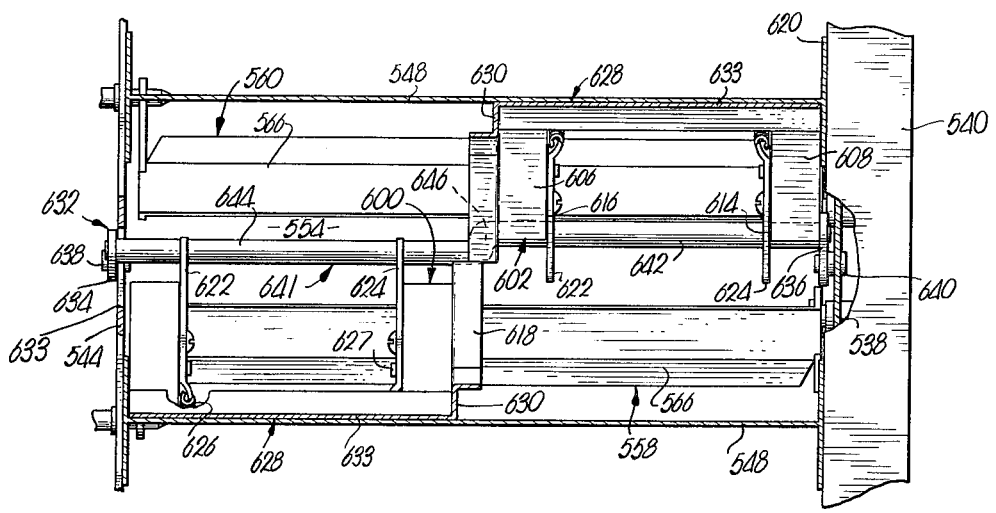

INVENTORS.
Herman R. Craven
Gerald C. Coker
Karl D. Fastner
BY Hovey, Schmidt, Johnson & Hovey.
ATTORNEYS.

United States Patent Office

3,231,129
Patented Jan. 25, 1966

3,231,129
STAGGERED STACK VENDING MACHINE
Herman R. Craven, Prairie Village, Kans., Gerald C. Coker, Garden City, Mich., and Karl D. Fastner, Kansas City, Mo., assignor to The Vendo Company, Kansas City, Mo., a corporation of Missouri
Filed Apr. 1, 1963, Ser. No. 269,487
22 Claims. (Cl. 221—67)

This invention relates to equipment for vending articles from a plurality of upright stacks and particularly to machines adapted to successively dispense cylindrical articles such as bottled or canned beverages, with the articles in adjacent columns of each stack being in staggered relationship to permit most efficient utilization of the storage capacity of the cabinet of the machine.

U.S. Patent No. 2,369,882 issued to John B. Brock on February 20, 1945, illustrates the first commercially successful mechanism for controlling release of cylindrical articles from a pair of overlapping columns or staggered stacks of the articles, and the basic invention of the Brock patent has been used for many years without substantial deviation therefrom except as to improvements on the specific release structure. Brock employed a swingable bail located below the staggered stack of articles to effect release of cans or bottles from alternate columns as the bail is swung through an arc to cause the bight thereof to be shifted from a location in underlying, supporting relationship to the lowermost article in one column of articles, to disposition in supporting relationship to the lowermost article in the opposed column of articles.

Problems found in commercial vending units utilizing a swingable bail for controlling successive release of articles from staggered stacks thereof, were, for the most part, caused by differences in effective article diameters and tolerance limits on the components of the release mechanism. Since the articles were maintained between upright walls in staggered relationship, variations in the effective diameters of the beverage bottles or cans caused the articles to be located at different positions vertically from the shiftable or swingable release member, depending on the effective diameter of the articles in the machine at a particular time. Thus, the release member had to be constructed to operate where cylindrical articles of not only minimum but also maximum effective diameters were likely to be encountered, and this presented substantial engineering problems inasmuch as the support bail or shiftable member would not at all times be located in the same position with respect to the center line of the lowermost article of the staggered stack at the completion of the vending cycle. In instances where the bottle supported by the shiftable control member was of a diameter somewhat greater than the mean value, it was necessary for the release member, in moving toward the opposed position of its path of travel to release the lowermost bottle of the staggered stack, to actually shift both of the columns vertically in order to move into article clearing disposition.

Manifestly, this required considerable force to be applied to the shiftable control member in order to effect shifting thereof and consequently required a relatively powerful and expensive motor. Many bottle or can vending machines of this general character have a number of compartments therein receiving staggered stacks of articles to be dispensed and have heretofore required a separate selectively actuatable motor for each stack or complicated individually selectively actuatable clutching means for coupling the motor to the release members.

It is, therefore, the primary object of the present invention to provide mechanism for controlling release of articles from multiple staggered stacks which can be operated by a relatively small and inexpensive motor and which furthermore provides for selectively coupling the motor to the release members of a number of stacks by means substantially more economical than heretofore to be found and with relative freedom from operational and maintenance problems.

In particular, it is an object of the invention to provide mechanism adapted to release articles successively from selected staggered stacks thereof which does not rely on a swinging bail or members shiftable into alternate dispositions below the lowermost articles of the stacks, thereby completely avoiding the problem of variations in power formerly required to operate the article release member due to variation in article diameters.

Also an important object of the invention is to provide mechanism for controlling successive release of articles alternatelyy from a pair of upright, staggered columns of articles wherein better anti-theft protection is provided than in the swinging bail or shiftable bight types of release mechanisms because of the provision of an article retainer below each upright stack of articles which absolutely precludes customer access to any of the articles prior to initiation of the vend cycle and which further prevents discharge of more than one article from the staggered stacks even though a person attempts to surreptitiously pull an article from an opposed column during delivery of the lowermost article of a particular stack.

Also, an important aim of the invention is to provide mechanism as described, wherein article retainers are provided below each upright stack of articles in respective columns with novel latch means being utilized which locks the retainer supporting the lowermost article of the staggered stacks, in bottle supporting disposition, until the latch means has been actuated by a customer upon suitable deposit in the vending machine. In this respect, another important object relates to the provision of novel latch means comprising a rotatable latch member having means thereon located to successively engage alternate retainers whereby as the rotatable latch member releases the retainer supporting the lowermost article, it simultaneously engages the other retainer to support the lowermost article in the adjacent column and the latch member consequently need be driven in only one direction, thus greatly simplifying the design of the driving mechanism.

It is a further very important object of the invention to provide means for controlling the lowering of the stack and its lowermost article as the latter is released until the stack load has transferred to the opposite retainer, for the following reasons. It has been found that if the articles are allowed to drop freely under the acceleration of gravity, not only is a carbonated beverage more subject to foaming when subsequently opened to the atmosphere but also the impact of the stack load when it contacts the opposed retainer, can be damaging to the associated mechanism or structures and furthermore in the case of bottles can contribute materially through accelerated wear to a reduction of their normal life. Additionally, the side thrust when stack drop is abruptly halted can attain such proportions as to cause occasional jamming of articles between opposed walls of the stack. The novel means for so controlling the rate of descent of the articles is a horizontally and transversely disposed bar vertically reciprocable through a path of travel terminating at its upper end immediately below the article retainers in blocking relationship thereto and with the lower end of its path of travel sufficiently displaced to release the lowermost article after the stack is supported by the opposed retainer.

Another important object of the invention is to provide mechanism for controlling successive release of articles alternately from upright, staggered stacks of articles which is adaptable for vending canned as well as bottled beverage, and which can be easily modified to handle a relatively larger quantity of canned beverages as compared to the bottled beverages. Since canned beverages are normally packaged in containers having a substantially shorter length than bottled beverage products, a simple and novel modification of the basic mechanism permits the stocking of canned products in separate, generally aligned front and rear stacks wherein a single component is provided in association with the release mechanism for alternating the vending of cans or articles of similar configuration between front and rear stacks. In this connection, it is an object of the invention to provide a novel secondary article support cooperable with the main article release mechanism to discharge products successively from front and rear stacks thereof, and which is operated by the articles during downward movement of the same in a vend cycle, to the end that no additional power means is required in order to operate the secondary support member.

In the drawings:

FIGURE 1 is a front elevational view of a vending machine of the type which may employ the present novel release mechanism and showing the customer actuatable buttons which control release of articles from a particular column in the machine housing;

Figure 2:
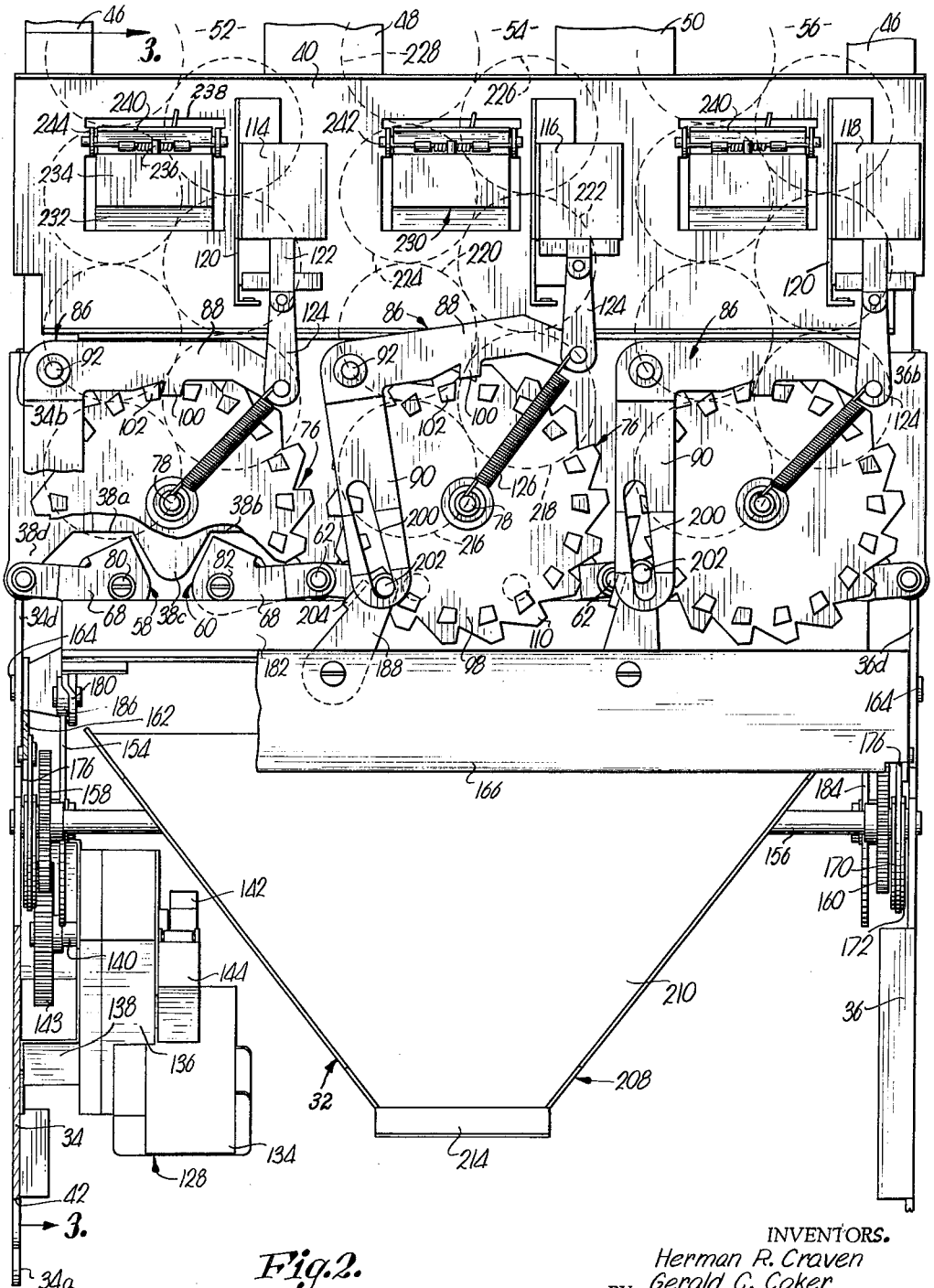
FIG. 2 is a fragmentary, front elevational view of mechanism for controlling successive release of articles alternately from a number of upright, staggered stacks of articles, with parts of the mechanism being broken away to reveal details of the construction thereunder.
Figure 3:
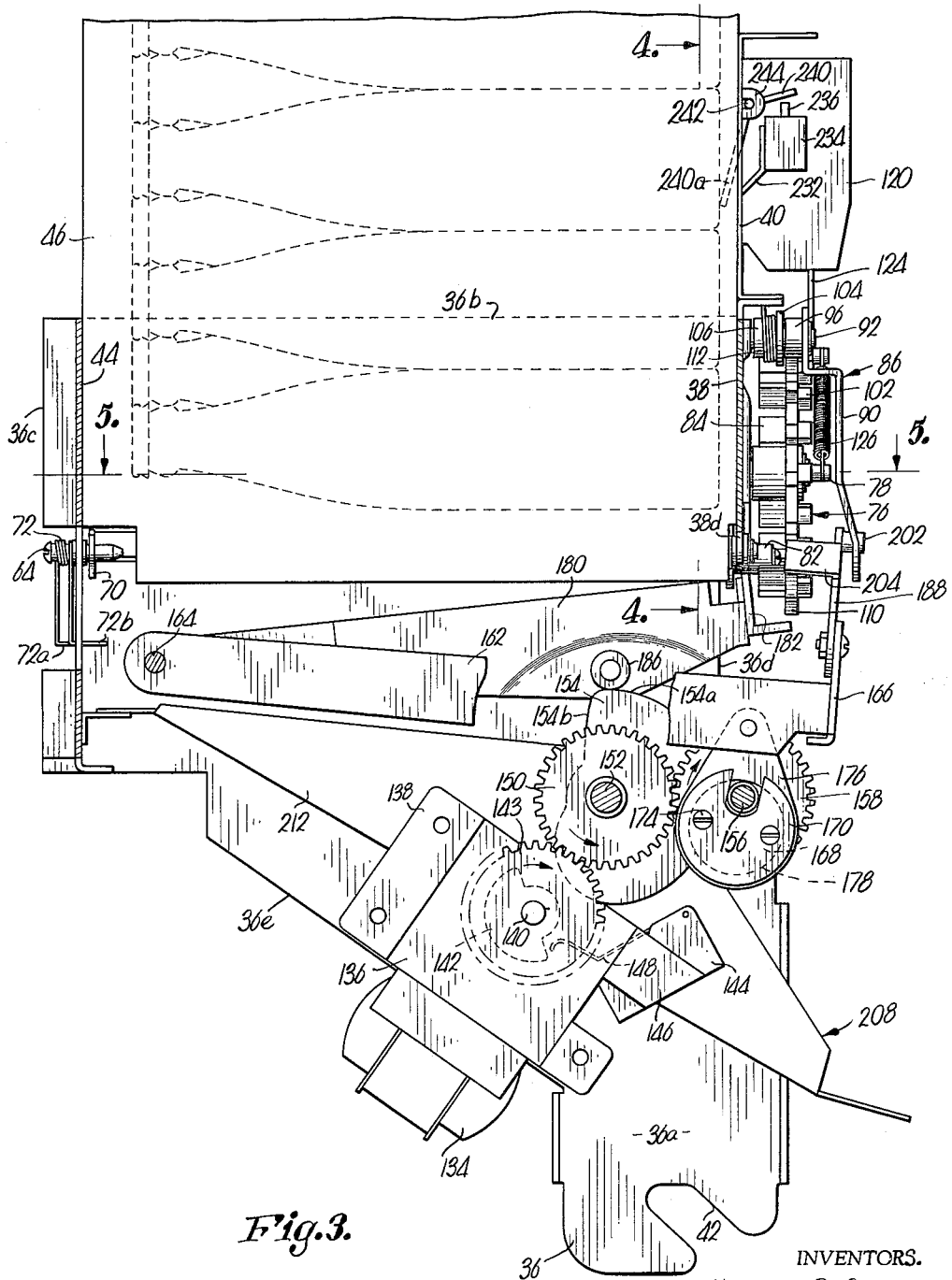
FIG. 3 is a vertical cross-sectional view taken substantially along line 3—3 of FIG. 2.
Figure 7:
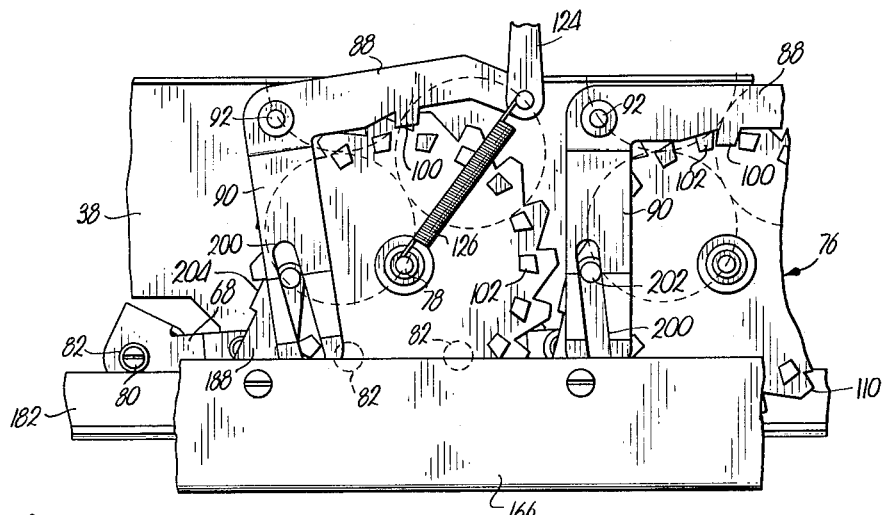
Figure 8:
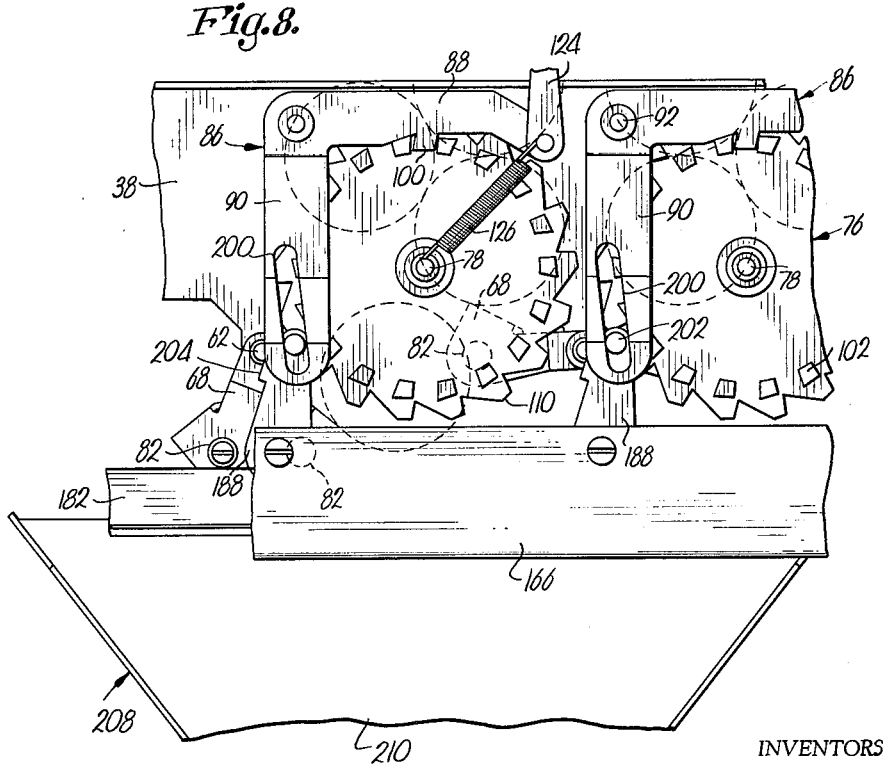
Figure 13:
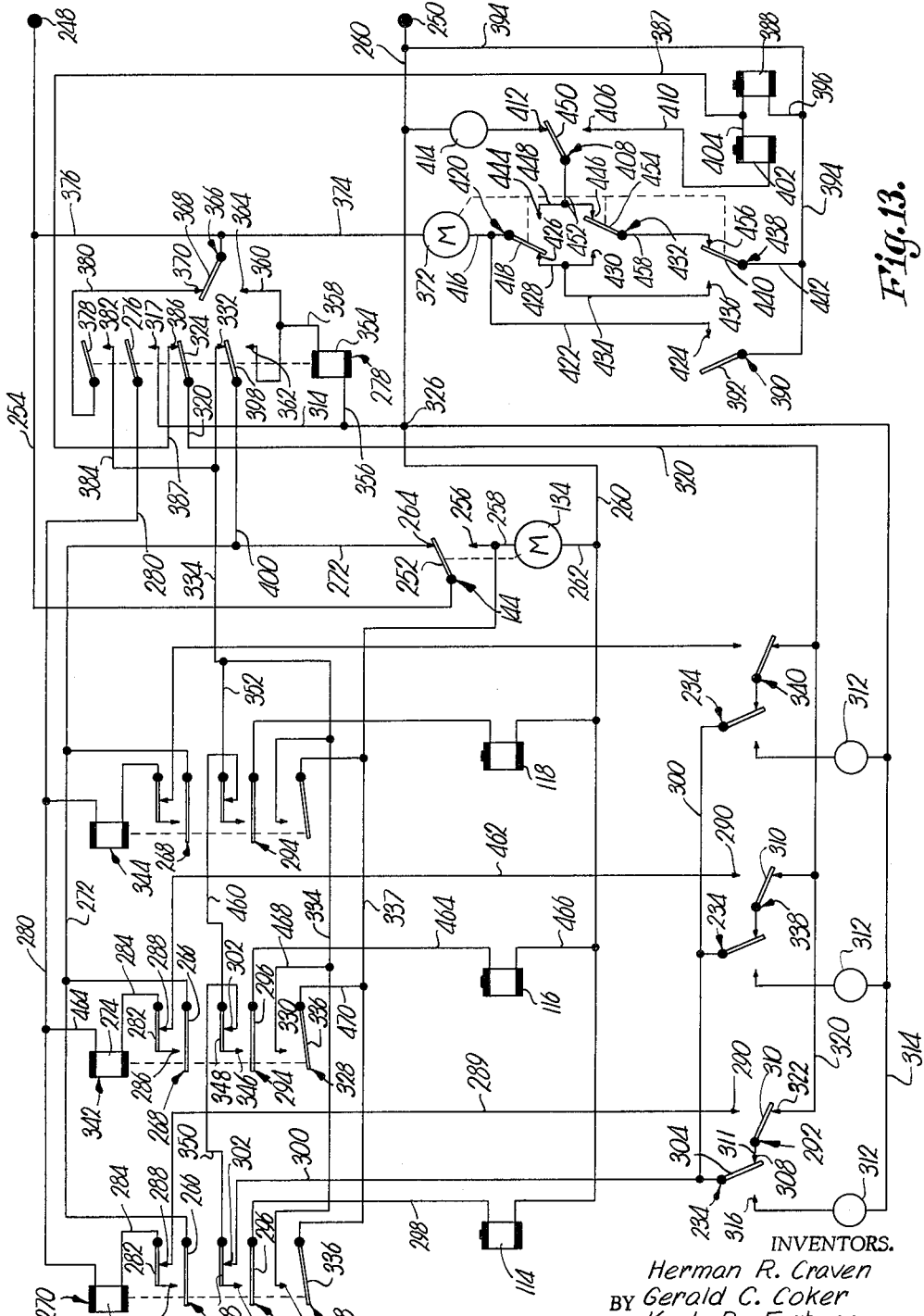

FIGS. 4 and 5 are vertical and horizontal cross-sectional views respectively, taken substantially along lines 4—4 and 5—5 of FIG. 3;

FIG. 6 is a fragmentary, cross-sectional view through a pair of retainers and looking rearwardly toward the spring members operably associated with the retainers to maintain the same in position to be cammed upwardly during the final portion of a vend cycle;

FIG. 7 is a fragmentary, front elevational view similar to FIG. 2, but illustrating one of the L-shaped connectors in the actuated disposition thereof and the latch rotating bar at the uppermost end of its path of travel;

FIG. 8 is a fragmentary, front elevational view substantially as shown in FIG. 7, but with the latch actuating bar illustrated in the location thereof during downward motion of the bar and showing the lowermost article of the associated staggered stack of articles in disposition just prior to release thereof;

FIG. 9 is a fragmentary front elevational view of a modified form of the present invention especially adapted for vending of canned beverages and with the article release control mechanism being removed from the structure for clarity;

FIG. 10 is a view similar to FIG. 9 but illustrating the swingable secondary bottle support member in another position thereof during release of an article from one of the stacks;

FIG. 11 illustrates the disposition of the structure shown in FIG. 10 just prior to release of the lowermost can from the upright stack thereof;

FIG. 12 is a horizontal view of the structure shown in FIG. 9 and looking downwardly from a horizontal plane somewhat above the components illustrated in FIG. 9; and FIG. 13 is a schematic representation of an illustrative control circuit utilizable with the release mechanisms shown in the preceding figures.

*Bottle vending mechanism (Figs. 1 to 8 and 13)*

A vending machine which may embody the article releasing mechanism referred to above, is broadly designated by the numeral 10 and includes a swingable front panel unit 12 that may be swung from the closed position thereof as illustrated, to an open location providing access to the rectangular storage compartment within the interior of the machine. Panel unit 12 is provided with three article selection buttons 14, 16 and 18 that may be manually actuated by the customer, and are normally maintained in the outer locations thereof by suitable spring means. The coin slot 20 permits proper deposit to be made in the machine for gravitational movement of the coins into coin handling and totalizing mechanism carried by the inner face of unit 12. Scavenger lever 22 permits coins or slugs that become lodged in the coin receiving mechanism, to be displaced therefrom so they will gravitate back to the customer for access through the coin delivery chute 24. An article delivery chute 26 on panel unit 12 communicates with the exterior of machine 10 through the delivery opening 28 so that the customer may remove a product from chute 26 after suitable actuation of the vend mechanism of machine 10. Swingable door 30 within chute 26 and carried by panel unit 12, slows down movement of the article during gravitation thereof in chute 26, and minimizes loss of refrigeration.

Since vending machine 10 is particularly adapted for dispensing bottled and canned beverages, it is contemplated that the lower portion of the machine cabinet be provided with conventional refrigeration mechanism for cooling the upper rectangular storage compartment of the machine and to maintain the beverages in the storage compartment at a predetermined low temperature level.

The article delivery and storage structure broadly designated 32 in FIG. 2, is designed to dispense cans or bottles from any one of three article receiving columns corresponding to the selector buttons 14, 16 and 18, but it is to be recognized that a smaller machine having fewer article receiving columns, or a larger unit having considerably more columns, is clearly within the scope of the present mechanism. Also, it should be pointed out that structure 32 illustrated in FIGS. 2 to 8 inclusive, is especially adapted for receiving and discharging bottled beverages, while the mechanism shown in FIGS. 9 to 12, and to be described in detail hereinafter, is especially useful for dispensing of canned beverages wherein the liquid containers are of shorter length than average beverage bottles.

The opposed, upright, horizontally spaced side mounting members 34 and 36 of structure 32, adapted to be secured to the inner side walls of the cabinet of machine 10, carry a front, transversely L-shaped plate 38 which spans the distance therebetween and underlies an upper, forward main plate 40 also extending between mounting members 34 and 36. As is most apparent from FIG. 3, mounting plate members 34 and 36 are of irregular peripheral configuration with the lower segments 34a and 36a having a notch 42 therein receiving mounting studs on opposed inner surfaces of the side walls of machine 10. The uppermost horizontal margins 34b and 36b extend the full width of structure 32 in a fore and aft direction, and merge with rear, irregularly shaped margins 34c and 36c respectively, as well as irregularly shaped forward margins 34d and 36d. The lower, irregular, inclined margins of mounting members 34 and 36, as represented by the illustrated margin 36e in FIG. 3, extend from the rear margins of corresponding mounting members to the lower rectangular portions 34a and 36a.

A rear panel 44 of a vertical height substantially equal to the rear margins of mounting members 34 and 36, spans the distance therebetween and is suitably joined to the rear extremities of members 34 and 36 to cooperate with front plate 38 in defining a generally rectangular frame. It should be pointed out at this juncture that front plate 38 has opposed, rearwardly directed flanges (not illustrated in detail) thereon which are connected to the outer forward margins of mounting members 34 and 36.

A pair of upright, horizontally spaced, parallel side partitions 46 extending upwardly from mounting members 34 and 36, cooperate with the divider partitions 48 and 50, extending between rear wall 44 and plates 38 and 40, to present bottle receiving support columns or compartments designated 52, 54 and 56. As is evident in FIG. 3, forward main plate 40 is of generally U-shaped configuration in cross-section, and is connected to the outturned flange of front plate 38, as well as to the outwardly turned leg portions of divider partitions 48 and 50 and side partitions 46.

A pair of retainers broadly designated 58 and 60 are provided between rear panel 44 and front plate 38, below each of the compartments 52, 54 and 56 respectively, as is evident from FIG. 2. With reference to the retainers 58 and 60 underlying column 52, it can be seen that the lower horizontal margin of front plate 38 is of irregular configuration defining a pair of upwardly directed notches 38a and 38b respectively aligned with each of the compartments 52, 54 and 56, and set off by an integral, downturned lug 38c intermediate adjacent upright partition walls (FIGS. 2 and 4). The depending leg portions 38d of plate 38 on opposite sides of notches 38a and 38b aligned with each compartment 52, 54 and 56, each carry pivot pins 62 which are axially aligned with corresponding, somewhat longer pivot pins 64 on rear wall panel 44. The horizontal, elongated, generally rectangular, transversely V-shaped support shelves 66 of retainers 58 and 60, have laterally extending legs 68 and 70 thereon which are pivotally mounted on the pins 62 and 64 respectively asociated with corresponding retainers. Coil springs 72 around each of the central rear pins 64 each have a pair of elongated legs 72a and 72b disposed to be engaged by the shelves 66 of opposed retainers 58 and 60, with the inturned lower extremities of legs 72a and 72b being located in elongated, horizontal slot 74 below pins 64. As is evident from FIG. 5, the inturned extremities of leg portions 72a and 72b of each coil spring 72 are located to be engaged by the rearmost legs 70 of adjacent retainers 58 and 60. Since the pins 64 at the outer side margins of rear panel 44 mount only one retainer thereon, the springs 72 on these outer side pins are provided with only a single leg 72a thereon to engage the legs 70 of respective retainers.

A common latch broadly designated 76 is provided for each of the compartments 52, 54 and 56, and preferably takes the form of rotatable, peripherally toothed wheel rotatable about an axis in parallel relationship to the axes of rotation of retainers 58 and 60 aligned therewith. With reference to FIG. 4 and 5, it is to be seen that an elongated pivot pin 78 extends through front plate 38 directly above each of the lug portions 38c thereof, and rotatably mounting a corresponding latch wheel 76. Each of the forwardmost legs 68 of retainers 58 and 60 have forwardly projecting extensions 80 thereon which receive rotatable sleeves 82 on the same located in proximal relationship to the inner planar surface 83 of an adjacent latch wheel 76. A series of rearwardly extending latch components 84 integral with the surface 83 of respective latch wheels 76, are positioned around the circumference of each latch wheel 76 in disposition to engage alternate sleeve members 82 on extensions 80 carried by retainers 58 and 60. The cross-sectional configuration and relative spacing of components 84 is best shown in FIG. 4, wherein it can be seen that one component 84 is in direct underlying, supporting relationship to the sleeve member 82 on a corresponding extension 80 while the component 84, spaced therefrom in a clockwise direction, is in spaced relationship to the adjacent extension 80. Similarly, the component 84 beyond the one mentioned above, and in further clockwise spaced relationship from the component 84 serving to support one of the retainers, also clears the adjacent extension 80 to permit the latter to swing downwardly without restriction.

An L-shaped operating arm broadly designated 86 is provided in overlying relationship to each of the latch wheels 76 with each arm having a generally horizontal leg 88 adjacent the upper portion of respective latch wheels, as well as an upright leg 90 along the left side margins of the latch wheels as shown in FIG. 2. Means for mounting arms 86 on plate 38 comprises elongated studs 92 extending through plate 38 above adjacent latch wheels 76, and each in turn carrying anti-backup pawl structure broadly designated 94 between respective arms 86 and the outer face of plate 38 as shown in FIG. 4. The annular spacers 96 rotatable on studs 92 and carrying arms 86 thereon, serve to maintain the legs 88 of operating arms 86 in proximal relationship to the outer planar surfaces 98 of corresponding latch wheels 76. The legs 90 of operating arms 86 are of irregular configuration longitudinally thereof, and have a major portion in greater spaced relationship from adjacent latch wheels 76 than is true with respect to the spacing of legs 88 from planar surfaces 98. Dogs 100 integral with the lower horizontal margin of each of the legs 88 of operating arms 86, and located intermediate the extremities of legs 88, normally engage adjacent, peripherally located lugs 102 integral with and projecting outwardly from the planar surface 98 of each of the latch wheels 76. Dogs 100 move out of the space between adjacent lugs 102 when a corresponding operating arm 86 is swung in a counterclockwise direction during initiation of a vend cycle as will be described.

The anti-backup pawl structure includes an elongated pawl member 104 carried by a spacer element 106 rotatable on respective studs 92, with the outer extremities of elements 106 being provided with outwardly turned extensions 108 thereon adapted to engage adjacent teeth 110 of latch wheels 76 to preclude retrograde rotation of a corresponding latch wheel. The coil springs 112 surrounding corresponding spacer elements 106 have legs 112a bearing against the underface of the outwardly projecting lip 38e of plate 38, while the opposed legs 112b of coil springs 112 are of generally J-shaped configuration and complementally engage pawl members 104 to bias the latter in a counterclockwise direction as indicated in FIG. 4.

Structure for selectively rotating operating arms 86 about the axes of respective studs 92, includes solenoids 114, 116 and 118 for the columns 52, 54 and 56 respectively, all mounted on brackets 120 carried by plate 40 above respective latch wheels 76. The armature arms 122 of each of the solenoids 114, 116 and 118 are operably coupled to the outer extremities of adjacent legs 88, by pivot links 124. Coil spring 126 between each of the pivot pins 78, and the pivot connections of links 124 to respective legs 88 of operating members 86, serve to normally maintain the armature arms 122 of solenoids 114, 116 and 118, at the outer end of their paths of travel. Thus, upon energization of the coils of solenoids 114, 116 and 118, the armatures are retracted thereby pivoting corresponding operating arms 86 about the axes of studs 92.

Mechanism for controlling swinging movement of the retainers 58 and 60 and for rotating one of the latch wheels 76 through a predetermined arc upon energization of a corresponding solenoid operably connected thereto, is broadly designated 128 and includes an electric motor 134 operably connected to a gear unit 136 mounted on the inner surface of mounting member 36, by bracket 138. The output shaft 140 of gear unit 136 carries a gear 143 thereon between the inner face of mounting member 36, and unit 136, as well as a 180° cam element 142 on the opposite end of shaft 140. Switch 144 secured to mounting bracket 146 carried by the housing of gear unit 136, has a contact actuating arm 148 positioned to be engaged by cam element 142 for maintaining the contacts of switch 144 in one condition thereof throughout 180° of the rotational path of shaft 140. Gear 143 is in operable intermeshing relationship with another gear 150 carried by a shaft 152 carried by mounting member 34. Cam 154 keyed to shaft 152 for rotation therewith has an outer cam surface 154a which merges with a cutaway edge 154b as best shown in FIG. 3. Elongated shaft 156 spanning mounting members 34 and 36 and mounted on the latter for rotation relative thereto, is positioned forwardly of shaft 152, and is provided with gears 158 and 160 at opposite ends thereof inboard of corresponding members 34 and 36. Gear 158 is in intermeshing relationship with gear 150 and is thereby driven by the latter from gear 143 operably coupled to motor 134.

A pair of elongated arms 162 pivotally mounted on the inner surfaces of mounting members 34 and 36 respectively, for swinging movement about the aligned axes of pivot pins 164, extend forwardly from the rear portions of the members 34 and 36, and terminate in overlying relationship to shaft 156. A horizontal bar 166 connected to the forwardmost extremities of arms 162, spans the width of the front portion of the delivery mechanism of machine 10, and in underlying relationship to the latch wheels 76 as indicated in FIGS. 2 and 3. Circular plates 168 keyed to shaft 156 for rotation therewith, and located adjacent gears 158, are each received between a pair of circular outer plates 170 and 172 connected to plate 168 by a pair of screws 174 extending through plates 170, 172 and 168. Connectors 176 pivotally coupled to the forwardmost ends of each of the arms 162, are provided with circular openings 178 in the lower extremities thereof, complementally receiving respective circular plates 168 therein, with the peripheral portions of connectors 176 surrounding openings 178, being located between opposed proximal plates 170 and 172. It is to be noted that the shaft 156 is disposed in eccentric relationship with respect to the axes of circular plates 168 and openings 178, so that during rotation of shaft 156, arms 162 are caused to oscillate about the axes of pivot pins 164.

Another pair of arms 180 carried by pivot pins 164 in proximal relationship to mounting members 34 and 36, and extending alongside arms 162, carry an elongated, horizontal bar 182 thereon located rearwardly of bar 166.

The mounting member 36 also carries a stub shaft coaxial with shaft 152 and carrying a gear thereon in intermeshing relationship with gear 160 on shaft 156. The cam 184 driven by the gear intermeshing with gear 160, and located adjacent mounting member 36, is of the same configuration as cam 154 and in phase therewith. Rollers 186 rotatably mounted on the opposed inner faces of arms 180 are positioned to operably engage the cam margins of cams 154 and 184 respectively. Thus, during rotation of shaft 152 by the gear 150 in intermeshing relationship with gear 143, the arms 180 and the bar 182 thereon are caused to oscillate relative to members 34 and 36.

An actuator link 188 is pivotally connected to the bar 166 for each of the operating arms 86, and as is clear from FIG. 2, the upright legs 90 of each arm 86, are provided with elongated slots 200 in corresponding lower extremities thereof which receive stub shafts 202 carried by the upper extremities of actuator links 188 and projecting outwardly therefrom. The inwardly directed extensions 204 on the upper margins of actuator links 188, and integral therewith, are located to engage an adjacent tooth 110 of a corresponding latch wheel 76, when an operating arm 86 is rotated in a counterclockwise direction into disposition as illustrated in FIG. 2.

It is also important to understand the relationship of bar 182 with respect to retainers 58 and 60, since bar 182 is moved into disposition to directly underlie the extensions 80 on legs 68 of retainers 58 and 60, to prevent downward swinging movement of any of the latter about the axes of pivot pins 62 and 64, during the interval that bar 182 is at the uppermost end of its path of travel.

An inclined, generally trapezoidal delivery chute 208 underlying all of the columns 52, 54 and 56, has a lower planar wall 210 sloping toward the forwardmost portion of the delivery structure, and integral with opposed triangular side walls 212, which are bent into upright disposition at the uppermost margins thereof and suitably joined to and supported by the inner faces of mounting members 34 and 36. A lip 214 on the lowermost end of trough 208 is aligned directly with the delivery opening 28. It is to be understood that a separate chute wall 26 may be employed in conjunction with the wall 210, or the latter can be used to form the bottom of the delivery trough in front panel unit 12.

Each of the columns 52, 54 and 56 is adapted to receive a plurality of cylindrical articles in staggered, overlapping relationship, and referring to FIG. 2, it can be seen that the stack 54 for example, has a series of beverage bottles 216, 218, 220, 222, 224, 226 and 228 in relative overlapping, staggered disposition with the lowermost bottle 216 being supported by the shelf 66 of the retainer 58 underlying compartment 54.

Bottle sensing structure broadly designated 230 is provided on the front face of plate 40 in alignment with each of the columns 52, 54 and 56, with each structure 230 being provided with brackets 232 secured directly to the outer face of plate 40, and serving as means for mounting individual switches 234 provided with upwardly extending actuating rods 236. Plate 40 is provided with an opening 238 therein aligned with each switch 234, and serving to clear respective L-shaped feelers 240 rotatably mounted on support pins 242 extending between mounting ears 244 therefor on opposite sides of each of the openings 238. Coil springs 246 around each of the support pins 242, have end legs bearing against the plate 40 and the sections 240a of the feelers 240, located within the confines of compartments 52, 54 and 56 respectively, for biasing feelers 240 in a clockwise direction viewing FIG. 3.

A representative control circuit for machine 10 is illustrated in FIG. 13 of the drawings, with the electrical power terminals being designated 248 and 250 respectively. The high side of the line as represented by terminal 248, is connected directly to the switch arm 252 of motor control switch 144 by a line 254. The normally open contact 256 of switch 144 is joined to vend motor 134 by line 258, while the opposite side of motor 134 is coupled to power lead line 260 joined to power terminal 250, by line 262. The normally closed contact 264 of switch 144 is connected to the movable relay switch arm 266 of the make-before-break relay switch 268 forming a part of selection relay 270, by a line 272. The coil 274 of selection relay 270 is joined to the switch arm 276 of credit relay 278 by a line 280, while the other side of coil 274 is connected to the shiftable contact arm 282 of relay switch 268, by line 284. The normally open contact 286 of switch 268 is operably associated with contact arm 282, so that switch arm 266 engages contact 286, prior to contact arm 282 being moved out of engagement with the contact 288 of switch 268. Contact 288 is joined by line 289 to the normally open contact 290 of the switch 292 operated during depression of button 14 by a customer. The other make-before-break relay switch 294 of selection relay 270 has a switch arm 296 which is joined to the solenoid 114 by a line 298. The other side of the coil of solenoid 114 is coupled directly to power line 260. Line 300 serves to couple the contact 302 of switch 294 to the switch arm 304 of the sold-out switch 234 associated with column 52 of machine 10. The contact 308 of the specified sold-out switch 234 is joined directly to the switch arm 310 of selector switch 292 by line 311. Sold-out lamp 312 is interposed in a line 314 extending from the normally open contact 316 of the first sold-out switch 234, and the normally open contact 317 of credit relay 278. Line 320 joins the normally closed contact 322 of selector switch 292 to the relay switch arm 324. It should be noted at this juncture that lines 314 and 260 are electrically interconnected at 326.

The remaining relay switch 328 of selection relay 270 is provided with a normally open contact 330 which is coupled to the contact 332 of relay 278 by line 334 and the switch arm 336 associated with contact 330 is connected directly to the motor line 258 by line 337. Selector switches 338 and 340 operable by push buttons 16 and 18 respectively, are also connected between lines 300 and 314 in parallel relationship with switch 292, and therefore the individual components of these switches need not be described in detail but where necessary to refer to the individual elements hereinafter, numerals identical to those employed with respect to switch 292 will be used. Thus, it can be seen that sold-out lamp 312 is provided for each of the selector switches, in conjunction with the sold-out indicating switches 234 previously described. Selection relays 342 and 344, identical with relay 270, and corresponding to the solenoids 116 and 118 associated with selector switches 338 and 340 respectively, are in parallel relationship with relay 270, between the lines 272 and 280, as well as lines 334 and 337. Where necessary to delineate the specific elements of relays 342 and 344, the same numbers for similar parts as applied to relay 270 will be employed. It should be noted however, that the normally open contact 346 of the relay switch 294 of relay 270, and operably associated with the movable contact arm 348, is joined by line 350 to the normally closed contact 302 of the make-before-break relay switch 294 of relay 342. Similar connection is made between the relay switch 294 of relay 344, by line 352 to the line 334. Coil 354 of credit relay 278 is connected by line 356 to line 314, and by line 358 to a line 360 coupling relay contact 362 with the normally open contact 364 of the coin switch 366 forming a part of the coin receiving unit carried by panel unit 12 of machine 10 and previously described. The movable switch arm 368 of coin switch 366, and which is adapted to be moved out of engagement with contact 370 and into engagement with contact 364, by either a nickel, dime or quarter passing through the coin accepting and changing unit of machine 10, is joined to the changer motor 372 by line 374. The line 376 interconnects line 254 and line 374. Contact 370 is coupled to the relay switch arm 378 of credit relay 278 by a line 380. The normally open relay contact 382 associated with relay switch arm 378, is joined to line 334 by line 384. The line 387 serves to connect the normally closed contact 386 associated with relay switch arm 324, with the nickel and dime coin return electromagnet 388 forming a part of the coin accepting and handling unit. The manually operable pay-out switch 390 of the changer unit has a switch arm 392 operably coupled to power line 260 by line 394, and the line 396 joins the coil of electromagnet 388 to line 394. The relay switch arm 398 of credit relay 278 is coupled to line 272 by line 400.

The 25¢ coin return electromagnet 402 is connected by line 404 to line 387, and to the normally open contact 406 of coin tube sensing switch 408 by line 410. The normally closed contact 412 of sensing switch 408 is connected to power line 260 and has a correct change only lamp 414 therein which is located on panel unit 12 of machine 10 in disposition indicating to the customer that correct change must be deposited in slot 20 when insufficient coins are present in the storage tube of the changer unit, to return adequate change to the purchaser.

Line 416 couples the pay-out motor 372 to the switch arm 418 of motor pay-out switch 420 while the associated line 422 interconnects line 416 and the normally open contact 424 of manually operable pay-out switch 390. The contact 426 of switch 420 is joined by line 428 to the contact 430 of anti-jackpot switch 432 and line 434 leads from line 428 to the contact 436 of 25¢ coin switch 438. The switch arm 440 of switch 438 is coupled to line 394 by line 442. The contacts 444 and 446 of switches 420 and 432 respectively, are interconnected by a line 448, which is in turn coupled to the switch arm 450 of sensing switch 408, by line 452. The switch arm 454 of anti-jackpot switch 432 is connected to the contact 456 of coin switch 438 by line 458. As is apparent by the dotted line on FIG. 13, the switch arms 418, 454 and 440 are under the direct control of cam members driven by the output shaft of motor 372.

*Operation of bottle vending mechanism*

The columns 52, 54 and 56 of machine 10 are initially loaded with bottles in staggered, overlapping relationship, as indicated by the dotted lines in FIG. 2, thereby causing the lowermost bottles to engage feelers 240 and maintain the upper lugs thereof out of engagement with the rods 236 of respective switches 234 so that the switch arms 304 of the same are in engagement with contacts 308. The serviceman then closes and locks panel unit 12 so that customers may obtain a product from machine 10 by depositing proper coinage in slot 20 followed by operation of one of the buttons 14, 16 or 18. Machine 10 is especially adapted for vending different types of beverages and, therefore, it is the usual procedure to provide different flavors or brands in the columns 52, 54 and 56 respectively. Therefore, the customer selects a particular desired beverage by depressing the corresponding push button 14, 16 or 18.

For purposes of this description, it is assumed that the products are to be vended at a price of 10¢ and that up to 15¢ in change may be returned to the customer if an excess deposit is made in the coin handling equipment through slot 20.

If a person desires to purchase a product from column 54, for example, using two nickels, he deposits the coins in slot 20 in successive order whereby such coins gravitate into the coin accepting or rejecting unit which tests the same for authenticity. It should be pointed out that the coins are free to gravitate downwardly through the coin tracks of the rejecting and accepting unit for passage toward the vend switch 366, because of the maintenance of coin return electromagnets 388 and 402 in an energized condition at the time of deposit of the coins. Electromagnets 388 and 402 are conventional components in vending machines of this type and are designed to return coins to the customer via chute 24 if the line cord for the machine is pulled, or during a vend cycle to preclude loss of deposit by the purchaser. The energization circuit for electromagnets 388 and 402 comprises the path including power terminal 248, line 254, switch arm 252 of switch 144, contact 264, line 272, line 400, relay switch arm 398, contact 332, line 334, line 352, make-before-break switch 294 of selection relay 344, line 460, make-before-break switch 294 of relay 342, line 350, contact arm 340, contact 302, line 300, coin sensing switch arm 304, contact 308, line 311, selection switch arm 310, contact 322, line 320, relay switch arm 324, contact 386, line 387, coil 388, line 396, line 394, line 260 and terminal 250. Electromagnet 388 controls elements blocking the path of travel of nickels and dimes through the coin handling unit, while the electromagnet 402 is adapted to block delivery of quarters to the changer section of the coin unit unless the switch arm 450 is in engagement with contact 406 indicating that sufficient coins are in the coin change storage tube to deliver three nickels in change to a customer if the product price is 10¢. The energization path of electromagnet 402 from line 387, assuming change coins are in the coin storage tubes causing switch arm 450 to be in engagement with contact 406, includes line 404, the coil 402, line 410, contact 406, switch arm 450, line 452, line 448, contact 446, switch arm 455, line 458, contact 456, switch arm 440, line 442, line 394 and line 260 leading to power terminal 250.

The coin handling unit includes a flipper element (not shown) in the path of travel of nickels downwardly therethrough so that the first nickel is caused to by-pass vend switch 366 and fall directly into the coin box of machine 10. However, the second nickel, and which thereby indicates that a dime has been deposited in the mechanism, engages the operating arm of switch 366 to cause switch arm 368 to be moved momentarily into engagement with contact 364. It may be noted at this juncture that the operating arm for switch 366 is located in the paths of travel of the second nickel through the machine as well as of dimes and quarters deposited through slot 20. Credit relay 278 is energized upon change of contacts of vend switch 366 through line 254, line 376, switch arm 368, contact 364, line 369, line 358, coil 354, line 356, line 314 and line 260 to terminal 250. Energization of coil 354 shifts all of the relay switch arms into the opposite positions thereof and establishes a holding circuit for coil 354 from line 272 and the closed switch 144 connected to line 254, through the relay switch arm 398, contact 362, line 360, and the circuit previously traced for coil 354 to terminal 250.

Machine 10 is now conditioned for selection of a product by the customer. Assuming that he depresses the push button 16 against the spring pressure thereon, switch arm 310 of selection switch 338 is moved into engagement with the associated contact 290 thereby effecting energization of the coil 274 of selection relay 342 via a path comprising line 254, line 376, switch arm 368, which is now returned to the initial position thereof after passage of the nickel thereby, contact 370, line 380, relay switch arm 378, contact 382, line 384, line 334, line 352, relay switch assembly 294, line 460, contact arm 348 and contact 302 of switch assembly 294 of relay 342, line 350, contact arm 340 and contact 302 of switch assembly 294 of selection relay 270, line 300, closed switch 234 associated with selection switch 338, switch arm 310 of switch 338, contact 290 of switch 338, line 462, contact 288 and contact arm 282 of switch assembly 268 of relay 342, line 284 coupled thereto, coil 274 of relay 342, line 464, line 280, relay switch arm 276, contact 317, line 318, line 260 and terminal 250.

Energization of the relay 342 causes the movable switch arms thereon to change contacts with the contact arm 266 of switch 268 moving into engagement with contact 286 prior to contact arm 282 moving out of engagement with contact 288. Similarly, switch arm 296 engages contact 346 before contact arm 348 leaves contact 302. In this manner, switch assembly 268 establishes a holding circuit for the coil 274 from line 462 through the contact switch arm 266 and contact 286.

Simultaneously therewith, solenoid 116 is energized from line 460 through contact arm 348, contact 346 and switch arm 296 of selection relay 342 via line 464 coupled directly to the coil of solenoid 116. The other side of the coil is joined to line 260 by line 466.

The anti-backup pawl member 104 serves the purpose of preventing rotation of the latch member 76 by the extension 80 of the retainer 58 or 60, resting on an associated latching component 84, during the very short period between the time of initial energization of the solenoid 116, and commencement of upward movement of operating bar 166 by motor 134. Since the parts of the operating mechanism have normal manufacturing tolerances it can be seen that even though the operating arm 86 is rotated by the solenoid which has been energized, to thereby shift an actuator link 188 into a location to cause the extension 204 thereon to engage a tooth 110 of the respective latch wheel 76, the spacing of the engageable parts prior to upward movement of bar 166 might be such as to permit rotation of the latch wheel 76 to release the retainer supported by a corresponding latching component 84. In this manner, a bottle could be released from the vertical stack by rotation of the latch wheel 76 in a direction opposite to that normally necessary for controlled release of a bottle from a selected stack.

Energization of the solenoid 116 causes the armature arm 122 thereof to be retracted, thereby pivoting the associated operating arm 86 about the axis of the mounting stud 92 therefor through the connector link 124. As the operating arm 86 is swung in a counterclockwise direction into the disposition illustrated in FIG. 2, leg 90 engaging stub shaft 202 within the slot 200, shifts the actuator link 188 associated therewith, to the right, causing the extension 204 thereon to be moved into engagement with an associated tooth 110 on the latch wheel 76 beneath the shifted operating arm 86. It is to be noted that the dog 100 on the shift arm 86 is simultaneously moved out of the path of travel of the lugs 102 on latch wheel 76.

At the time of energization of the coil of solenoid 116, the vend motor 134 is also energized through the relay switch 328 of selection relay 342 via a path from line 334 through the line 468 coupling line 334 to the contact 330 of relay 342, relay switch arm 336 of the relay, line 470, line 337, line 258, field windings of motor 134, line 262 and line 260 leading to terminal 250. Operation of motor 134 causes the output shaft 140 of the gear unit 136 coupled thereto, to be rotated in a counterclockwise direction as shown in FIG. 3, to thereby effect rotation of gear 150 on mounting member 36 in a clockwise direction.

Since the gear 150 carried by member 36 is in intermeshing relationship with gear 158 aligned therewith and secured to shaft 156, both of the gears on shaft 156 will be rotated thereby effecting movement of cams 154 and 184 in a counterclockwise direction when viewing FIG. 3. In this manner, the rollers 186 on arms 180 are caused to roll along the outer cam margins of cams 154 and 184 thereby maintaining bar 182 in the location of the same illustrated in FIGS. 2 and 3. The upper horizontal margin of bar 182 is thus maintained directly beneath extensions 80 on retainers 58 and 60 precluding downward swinging movement of any of the retainers so long as the bar 182 is at the upper end of its path of travel. During the initial rotation of gear unit shaft 140, the cam 142 is rotated in a clockwise direction whereby contact actuating arm 148 of switch 144 is permitted to remain in the normal disposition thereof so that the electrical path for energization of motor 134 is still through the switch 328 of selection relay 342.

Rotation of shaft 156, as previously explained, causes the connectors 176 coupled to arms 162 to be moved upwardly with respect to the axis of shaft 156, as the circular plates 168 are rotated therewith within openings 178, causing the horizontal bar 166 to be shifted upwardly relative to the latch wheels 76. Because of the disposition of the actuator link 188 associated with column 54, in the location thereof shown in FIG. 2, upward movement of the bar 166 causes the extension 204 thereon to engage a proximal tooth 110 on the aligned latch wheel 76, thereby effecting rotation of the latter in a clockwise direction as shown in FIG. 2. As is best evident from FIG. 4, rotation of the latch wheel 76 aligned with column 54 in a counterclockwise direction as illustrated in this figure, causes the latch component 84 on the rear surface 83 of the latch wheel 76, to be moved from beneath the extension 80 of the associated retainer 58 and with a component 84 moving into underlying relationship to the extension 80 of the underlying retainer 60. The retainer 58 below column 54, is supporting bottle 216 thereon but the retainer 58 does not swing downwardly under the weight of the bottles upon release of the extension 80 thereon from a component 84 on the rear face of the aligned latch wheel 76, because the extensions 80 are still resting on the upper margin of the common bar 182.

As soon as the cam 142 on shaft 140 engages the actuating arm 148 to shift switch arm 252 out of engagement with contact 264 and into engagement with contact 256, the circuit to relay 342 is broken, thereby deenergizing coil 274 thereof and providing a motor carry-over circuit for motor 134 through the switch 144 directly between lines 254 and 260. In this manner, the motor 134 continues to operate until the actuating arm 148 leaves the outer cam surface of cam 142. Deenergization of the selection relay 342 and credit relay 278 occurs by change of contacts of motor carry-over switch 144. Operation of actuating arm 148 by cam 142 also breaks the holding circuit for relay 278 and deenergization of relay 342 also results in deenergization of the coil of solenoid 116. However, deenergization of the coil of the solenoid does not result in immediate rotation of the operating arm 86 under the influence of spring 126, because of the engagement of dog 100 on the top of an adjacent lug 102. However, when the shaft 156 has been rotated through a 180° arc of rotation, the operating bar 166 has reached the uppermost end of its path of travel and is ready to commence downward movement. It is clear that the latch wheel 76 has completed its angular movement to cause the dog 100 to become aligned with the space between adjacent lugs 102 so that the arm 86 may be rotated in a clockwise direction by spring 126 and thereby allowing dog 100 to reengage the lugs 102 and preclude further rotation of the wheel 76. During the time of energization of the credit relay, and after deenergization thereof, while the switch arm 252 is in engagement with contact 256, the circuit to coin return electromagnets 388 and 402 through switch arm 324 and contact 386 is broken, thereby preventing the customer from inserting additional coins in the machine since such coins will be deflected directly into the coin return chute 24.

Rotation of the cams 154 and 184 through substantially 180°, then permits the rollers 186 on arms 180 to ride inwardly against the cutaway portions of the cams, thus allowing arms 180 to swing downwardly about the axes of pivot pins 164 whereby bar 182 is shifted downwardly through a path of travel to permit the retainer 58 to swing about the axes of pivot pins 62 and 64. The retainer 58 is permitted to swing through an arc sufficient to cause the lowermost bottle 216 to clear the opposed retainer 60 and gravitate onto the trough 208 for delivery to the customer through opening 28. During the downward shifting of bottle 216 while still partially supported by retainer 58, all of the bottles thereabove move downwardly with bottle 218 coming to rest on the shelf 66 of the retainer 60 therebelow. Notwithstanding the fact that common bar 182 has shifted downwardly, the retainer 60 supporting bottle 218 cannot swing downwardly under the weight of the bottle because of support of the extension 80 of retainer 60 on an aligned component 84 on the rear face 83 of latch wheel 76.

The common bar 182 also serves the important function of slowly lowering the retainer 58 through the path of travel to release bottle 216 so that the bottle does not hit the upper face of trough 208 with sufficient force to possibly break the same and no substantial shocks are imparted to the operating mechanism as has been the case in prior bottle delivery machines.

When the retainer 58 reaches the lowermost extremity of its path of travel, leg 70 thereon engages the leg 72a of coil spring 72 on the associated pivot pin 64, to place the spring 72 under tension. Thus, upon release of the bottle 216 from retainer 58, the leg 72a of the spring 72, which has been placed under tension, returns the retainer 58 to the position of the same illustrated in FIG. 6, whereby the extension 80 thereon is in a suitable location to be cammed upwardly upon return of the bar 182 to the stand-by location thereof as the rollers 186 engage the steep slope of cams 154 and 184 respectively.

If the level of bottles in any particular column falls below the structure 230 aligned therewith on mounting plate 40, the coil spring 246 engaging the feeler 24 above the bottles, swings in a clockwise direction as shown in FIG. 3, to operate the actuating rod 236 of a corresponding switch 234 thereby energizing the sold-out lamp 312 associated with the switch 234 and preventing customer actuation of the selection relay connected thereto.

The relays 270, 342 and 344 also prevent a purchaser from actuating more than one solenoid 114, 116 or 118 at a time, since the solenoids receive power through the relay switches of the selection relays and the series interconnection of relay switch assemblies 294 precludes more than one of the relay coils being energized at a time.

If the customer deposits 25¢ in slot 20, the coin engages the operating arm of switch 366 to shift switch arm 368 into engagement with contact 364 to initiate the cycle previously described, and with the changer unit also being energized by the coin shifting switch arm 440 into engagement with contact 436 and providing an energization path for changer motor 372 through line 254, line 376, line 374, motor 372, line 416, switch arm 418 of switch 420, contact 426, line 428, line 434, contact 436, switch arm 440, line 442, line 394 and line 250.

As soon as the motor 372 commences operation, cams operably driven thereby shift the switch arm 418 into engagement with contact 444 thereby establishing a holding circuit for the motor 372 through switch 420, antijackpot switch 432 and switch 438, since the switch arm 440 has now returned to engagement with contact 456. The motor is cycled to deliver three coins through oscillatory plate structure shiftable beneath the coin storage tubes, to deliver three nickels to the customer before the motor is deenergized by opening of switch 418. Antijackpot switch 432 prevents jackpotting of the coin storage tubes if the switch 420 should stick in an actuated condition for any reason. The switch 390 is caused to operate changer motor 372 to discharge all change coins from the storage tubes for inventory purposes.

*Mechanism for vending canned beverages*
*(FIGS. 9 to 12)*

Mechanism especially adapted for vending beverages in cans is illustrated in FIGS. 9 to 12 inclusive of the drawings, and since the structure controlling swinging movement of the article retainers below the can receiving columns is identical in construtcion and operation with the mechanism illustrated in FIGS. 1 to 8 inclusive, the details of the latch wheels, and components for controlling rotation of the latch wheels has been omitted from FIGS. 9 to 12.

Since cans in which most beverages are packaged are usually of substantially shorter longitudinal length than bottles having an equivalent quantity of liquid therein, it was determined that the shorter length of the cans permitted location of two upright stacks thereof in end-to-end relationship without necessitating the utilization of a substantially larger cabinet housing than is utilized for bottle vending mechanism. Therefore, by using a cabinet adapted to accommodate bottles in staggered overlapping relationship, as well as two end-to-end stacks of cans for each column, it is possible to build a standardized unit with the only major distinction between the can vending mechanism and that utilized for dispensing of bottles relating to the structure for receiving the articles to be delivered from the machine.

Only one can receiving column is shown in FIGS. 9 to 12 inclusive, but it is to be understood that an individual column is provided for each of the latch wheels 76 for discharge of canned beverages therefrom of different brands or flavors in the same manner as described with respect to the bottled beverages.

The can receiving compartment broadly designated 554 has a series of upright side partitions between the rear wall 544 and the front plate 540 similar to partitions 46 of machine 10, as well as a series of intermediate, upright, horizontally spaced parallel divider partitions 548 which are located on each side of a pair of cooperable article retainers 558 and 560, respectively. A pair of lower dividers broadly designated 600 and 602, respectively, are provided in the compartment 554 between divider partitions 548, with the divider 602 being located forwardly of divider 600, as is evident from FIG.

12. The dividers 600 and 602 are of identical cross-sectional configuration, but face in opposite directions so that divider 602 operates to direct cans toward the retainer 558 while divider 600 diverts cans toward the retainer 560. Both of the dividers 600 and 602 are located at an angle with respect to vertical divider partitions 548. Describing in detail the cross-sectional configuration of divider 602, it is to be noted from FIGS. 9 and 12 that the upright, elongated, rectangular side wall 604 in abutting, complemental relationship to the inner face of the adjacent partition 548 extends upwardly from a location adjacent the zone of merger of plates 538 and 540 to a level at least approximately midway of the vertical height of partitions 548. A pair of horizontally spaced, inclined bottle guide walls 606 and 608 extend from the lower edge 610 of divider 602 to the upper margin 612 thereof and are integral with wall 604 through the medium of triangular, parallel, horizontally spaced end walls 614 and 616, respectively. The generally L-shaped rear leg 618 on the upright rear margin of guide wall 606 provides a rear guide for the forwardmost stack of cans to retain the same between the transversely extending legs 620 of divider partitions 548 and the portion of leg 618 in perpendicular relationship to the major plane of divider partitions 548. Because of the identical configuration of dividers 600 and 602, the individual components thereof are given the same identification numerals.

A pair of anti-theft locking elements 622 and 624 are provided on each of the dividers 600 and 602, with each element 622 being pivotally mounted intermediate the ends thereof on the inner face of end wall 616 while each of the elements 624 is pivotally carried by the inner face of corresponding end walls 614. Coil springs 626 joined to the normally uppermost extremities of elements 622 and 624, adjacent divider partitions 548, are also connected to corresponding end walls 614 and 616 to normally maintain the elements in the disposition thereof illustrated in FIG. 9 and thereby projecting into the path of travel of cans downwardly in corresponding inclined channels therefor. Tabs 627, bent toward each other from opposed end walls 614 and 616 and each divider 600 and 602, are located to restrict pivoting of corresponding elements 622 and 624 in the directions of rotation thereof under the influence of springs 626.

Inclined guide plates broadly designated 628 of generally Z-shaped cross-sectional configuration are provided on divider partitions 548 in overlying relationship to dividers 600 and 602 and extending upwardly from the top margins 612 thereof to substantially the top edge of partitions 548. The generally L-shaped leg portions 630 of each guide plate 628, and integral with the main planar section 633 thereof at one upright margin of the latter, are in alignment with the legs 618 of dividers 600 and 602 to also maintain cans in proper vertical alignment between divider partitions 548.

Shiftable structure broadly designated 632 is carried by the rear wall 544 and the front plate 538 in underlying relationship to the compartment 554 to cause alternate release of cans from the stacks thereof inclined in different directions, notwithstanding the fact that the cans are not in staggered overlapping relationship as is the case with the bottles in machine 10. Structure 632 comprises a generally U-shaped component having a pair of opposed end legs 634 and 636 pivotally mounted on rear wall 544 and front plate 538, respectively, by pivot pins 638 and 640. The bight of structure 632 comprises a bar 641 of generally circular cross-sectional configuration and having a forward stretch 642 integral with the rear stretch 644 through an intermediate stretch 646 at an angle with respect to the longitudinal axes of stretches 642 and 644, as is most apparent from FIG. 12. The rear wall 544 is provided with an opening 633 therein clearing bar 641 and limiting the angle of oscillation thereof about the axes of pivot pins 638 and 640. It is also to be noted that the stretches 642 and 644 are of approximate length equal to the can receiving channels defined by dividers 600 and 602, with the offset between stretches 642 and 644 being such that stretch 642 engages the chime of a can 648 located on the shelf 566 of retainer 558, while the stretch 644 is in underlying relationship to a can 650 in the channel defined by divider 600.

*Operation of can delivery mechanism*
*(FIGS. 9 to 12)*

The columns of the machine receiving cans are initially loaded in a manner similar to the way in which bottles are placed in columns 52, 54 and 56 of machine 10, with the exception that the cans in compartment 554, for example, are not located in relative staggered, overlapping relationship above the retainers 558 and 560 but are disposed in a pair of end-to-end stacks inclined in opposite directions with respect to the vertical as defined by the dividers 600 and 602, as well as guide plate 628 located between adjacent side partitions and inner divider partitions 548. Thus, as shown in FIG. 9, the front column of cans slants toward the retainer 558, while the rear column slants toward the retainer 560. Although the lowermost cans of each vertical column are not in generally staggered, overlapping relationship at the lower extremities of each stack, the cans are in staggered disposition as the upper extremities of dividers 600 and 602 are approached, because of the increasing width of the respective can receiving columns in a direction away from the delivery mechanism. In this way, the capacity of the machine is substantially increased without interfering with alternate delivery of cans by the control mechanism which is identical with that previously described for vending bottled beverages.

Thus, when the ratchet wheel corresponding to column 554 is rotated through a predetermined arc to release the retainer 558 for gravitational movement downwardly under the weight of the cans in the stack defined by divider 602, the U-shaped structure 632 swings to the left, as indicated in FIG. 10, under the weight of can 650 and the articles thereabove during release of can 648. As is apparent from FIG. 9, the stretch 644 of bar 641 initially disposed in supporting relationship to can 650 is located to the left of a line between the axis of rotation of structure 632, and the axis of can 650, so that as soon as the can 648 moves downwardly to permit structure 632 to swing to the left as viewed in FIGS. 9 and 10, the weight of can 650 and those cans thereabove on stretch 644 of bar 641 biases the latter to the left to permit can 650 to descend onto the shelf 566 of retainer 560. In this manner the stretch 642 of structure 632 is shifted into disposition to engage and support the next can 652 in the stack defined by divider 602, whereby the next article released from the column 554 will be the can 650 supported by retainer 560.

Thus alternate release of the retainers 558 and 560 by the control mechanism therefor effects oscillatory movement of the structure 632 which in turn controls delivery of articles onto the shelves 566 of corresponding retainers 558 and 560. Engagement of bar 641 with opposed upright margins of the rear wall 544 defining the sides of opening 633, prevents structure 632 from swinging through an arc terminating in alignment with or past vertical planes through the axes of corresponding lowermost cans which would thereby render the structure 632 inoperable for controlling release of cans from dividers 600 and 602.

During downward movement of the cans past the locking elements 622 and 624 on each divider 600 and 602 the outer extremities of the blocking elements are depressed against the influence of spring 626 to an extent clearing the adjacent cans, whereupon the elements are then returned to the initial locations of the same. In this manner a person attempting to surreptitiously remove articles from the machine cannot force a can carried by one of the retainers 558 or 560 upwardly in a manner to swing the structure 632 through an arc which would permit release of an article from the other slanting stack. When a person attempts to move the lowermost can upwardly, such can engages the elements 622 and 624 overlying the same, whereby the elements pivot until the tabs 627 are engaged, thereby blocking further upward movement of the lowermost can.

Having thus described the invention, what is claimed as new and desired to be secured by Letters Patent is:

1. An article dispensing mechanism comprising:
   article receiving magazine structure having opposed wall surfaces located in spaced relationship a distance greater than the maximum effective diameter of each of the articles and less than twice said diameter whereby a stack of articles in the structure present a pair of upright columns of articles in relative overlapping, staggered relationship;
   a pair of retainers adjacent the lower portion of the structure and disposed to alternately support the lowermost article of said columns, each of said retainers being independently movable from an article supporting position to a location clearing the article supported thereby for release from the same;
   means for returning each of the retainers to said positions after movement of the same to said locations thereof;
   a latch mounted for rotation adjacent the retainers and having latching components thereon spaced around the axis of rotation of the latch in locations causing one of the components to be disposed to support one of the retainers while the other components clear the other retainer; and
   driving means operable to rotate said latch through an increment to move a component to a location for supporting the retainer previously unsupported by a latching component as said one component is moved out of the retainer supporting disposition thereof whereby articles are alternately dispensed from said columns in response to rotation of said latch through successive increments to release alternate retainers.

2. Dispensing mechanism as set forth in claim 1 wherein said latch is provided with a series of equally spaced teeth in the periphery thereof and said driving means includes a reciprocable member successively engageable with successive teeth of said latch proximal thereto for rotating the latter through one of said increments of movement thereof upon each reciprocation of the reciprocable member.

3. Dispensing mechanism as set forth in claim 1 wherein said latching components are located in equal spaced relationship about the periphery of the latch and said driving means is operable to rotate the latch through successive equal increments.

4. Dispensing mechanism as set forth in claim 1 wherein said latch includes a generally circular plate mounted for rotation with one planar surface thereof in facing relationship to said retainers, said latching components projecting from said one surface thereof toward the retainers, the latter being provided with extensions thereon located to alternately rest on an adjacent latching component on said plate.

5. An article dispensing mechanism comprising:
   article receiving magazine structure having opposed wall surfaces located in spaced relationship a distance greater than the maximum effective diameter of each of the articles and less than twice said diameter whereby a stack of articles in the structure present a pair of upright columns of articles in relative overlapping, staggered relationship;
   a releasable retainer located below each column respectively in normal disposition to alternately support the lowermost article of said columns and thereby providing support for all of the articles of both columns;
   a circular latch having latching components equally spaced adjacent the periphery thereof and a series of equally spaced teeth in said periphery, said latch being rotatable about its axis in successive increments to cause said latching components to alternately latch and release each of the retainers and latch one while releasing the other;
   reciprocable driving means for said latch successively engageable with said teeth in the periphery thereof for rotating said latch through said increments whereby said retainers are alternately released; and
   reciprocable lowering means normally in blocking disposition to both retainers, said lowering means receiving a retainer upon release thereof by said latch and operable to lower the same to release the article supported thereon and thereafter to return the relased retainer to said normal disposition thereof.

6. An article dispensing mechanism comprising: a plurality of article receiving magazine structures each having opposed wall surfaces located in spaced relationship a distance greater than the maximum effective diameter of each of the articles and less than twice said diameter whereby a stack of articles in each structure present a pair of upright columns of articles in relative overlapping, staggered relationship;
   a pair of retainers adjacent the lower portion of each of the structures with each pair of retainers being disposed to alternately support the lowermost article of the columns of a respective stack, the retainers of each pair thereof being independently movable from an article supporting position to a location clearing the article supported thereby for release from the same;
   means for returning each of the retainers to said positions after movement of the same to said locations thereof;
   a rotatable latch mounted for rotation adjacent each pair of retainers associated with a respective structure, each of said latches being provided with latching components thereon alternately engageable with the retainers below a corresponding stack of articles as the latch is rotated through successive increments of travel;
   a latch driving member movable along a reciprocable path of travel relative to all of said latches; and
   selectively actuatable means operably associated with each of said latches for operably coupling the driving member to a latch associated with a selected article receiving structure to effect rotation of the latch through one of said increments of travel thereof to move one of the components on a latch to a location for supporting the previously unsupported retainer under the selected structure as another component is moved out of the retainer supporting disposition thereof whereby an article is dispensed only from the selected structure.

7. Dispensing mechanism as set forth in claim 6 wherein said latch driving member is located below the axes of rotation of the latches and is initially moved upwardly toward the latches and thence downwardly away from the latter during each cycle of operation thereof, said selectively actuatable means each including an element on said driving member and selectively shiftable into disposition to effect rotation of a corresponding latch through said increment of travel thereof.

8. Dispensing mechanism as set forth in claim 7 wherein each of said elements is movable into disposition to engage and rotate a respective latch through said increment of travel thereof in response to upward movement of said driving member toward said latches.

9. Dispensing mechanism as set forth in claim 8 wherein each of said selectively actuatable means includes a dog normally engaged with respective latches to preclude rotation thereof and means coupled to each of said dogs for disengaging the latter from respective latches upon actuation of a corresponding selectively actuatable means, to permit rotation of the latch through said increment of travel.

10. Dispensing mechanism as set forth in claim 9 wherein each of said latches is provided with a series of lugs thereon extending away from the structures receiving said stacks and located in circumferentially spaced relationship relative to the axis of rotation of a respective latch, said lugs being positioned to be engaged by a corresponding dog for locking said latches to preclude rotation of the same except after actuation of a corresponding selectively actuatable means.

11. Dispensing mechanism as set forth in claim 10 wherein each of said latches is of generally circular configuration and is provided with a series of generally radially extending teeth in the outer peripheral margin thereof, each of said elements having an extension thereon engageable with the proximal tooth of a respective latch to rotate the latter in response to shifting of said driving member.

12. Dispensing mechanism as set forth in claim 11 wherein is included a pawl biased into engagement with said teeth to prevent retrograde movement of a latch during disengagement of said dog from said lugs after actuation of the corresponding selectively actuatable means and before driving engagement of said element with said teeth.

13. Dispensing mechanism as set forth in claim 10 wherein each of said elements is coupled directly to said driving member for vertical reciprocation therewith, each of said selectively actuatable means including a generally L-shaped operating arm mounted for swinging movement about an axis in spaced, generally parallel relationship to the axis of rotation of the corresponding latch and having a first leg coupled to a corresponding element for shifting the latter into said disposition thereof in response to swinging of said arm through a predetermined arc, each of said arms having a second leg carrying said dog thereon in location to normally engage the lugs of the associated latch until the corresponding selectively actuatable means is actuated.

14. Dispensing mechanism as set forth in claim 13 wherein said selectively actuatable means each includes a solenoid operably coupled to a corresponding operating arm for swinging the latter through said predetermined arc of movement thereof.

15. Dispensing mechanism as set forth in claim 6 wherein said retainer returning means includes a bar extending across all of the article receiving structures and normally positioned to block movement of all of said retainers from said positions thereof toward said locations of the same, said bar being operable to receive and support a retainer upon release thereof by a corresponding latching component, and reciprocable means coupled to said bar for restricting lowering thereof and thereby the article supporting retainer to control release of the article supported thereon, and for thereafter returning the released retainer to the initial position thereof.

16. Dispensing mechanism for elongated articles comprising:
an article magazine having structure for confining two upright columns of articles with the articles of one column in generally end-to-end relationship to the articles of the other column, said structure being arranged to direct the lowermost articles of the respective columns toward opposite sides of the structure;
a pair of retainers adjacent the lower portion of the structure and each independently movable from a position for supporting the lower article of a respective column in the lowermost position thereof to a location clearing the article supported thereby for release from the same;
means for returning each of the retainers to said positions after movement of the same to said locations thereof;
an elongated swingable gate located on the structure above the retainers in general parallelism with the longitudinal axes of the articles in said structure, said gate having a pair of spaced sections with each section being positioned to alternately support the lowermost article of one column above the retainer thereunder while the lowermost article of the other column is supported directly by the retainer thereunder, each of said sections being located to be driven by an article supported thereby into disposition to bring the other section thereof into article supporting disposition as the article supported directly by one of said retainers is released whereby the sections support the lowermost article of alternate columns and articles are released from alternate columns upon release of alternate retainers;
a latch mounted for rotation adjacent the retainers and having latching components thereon spaced from the axis of rotation thereof, said components being positioned in locations about said axis of rotation of the latch causing one of the components to be disposed to support one of the retainers while the other components clear the other retainer; and
driving means operable to rotate said latch through an increment to move a component to a location for supporting the previously unsupported retainer as said one component is moved out of the retainer supporting disposition thereof whereby articles are alternately dispensed from one column and then the other column in response to rotation of said latch through successive increments.

17. Dispensing mechanism as set forth in claim 16 wherein said structure includes separate pairs of dividers for confining respective columns of articles therebetween, one of the dividers of each pair being inclined in opposite directions with respect to a vertical plane therebetween, said dividers being located to direct the articles in one column toward one retainer and the articles in the other column toward the other retainer.

18. Dispensing mechanism as set forth in claim 16 wherein said gate comprises an elongated bar with said sections thereof being in offset relationship longitudinally of the bar with one section being spaced from the other section a distance causing one section to be engaged by the lowermost article of one column supported directly by one of said retainers and thus maintain the other section of the bar in a position thereof to support the lowermost article of the other column and thereby above and out of engagement with the retainer therebelow.

19. Dispensing mechanism as set forth in claim 18 wherein said sections are offset a distance causing the section positioned to support the lowermost article in a respective column while the lowermost article of the other column rests on the retainer therebelow, to be located to one side of the center of gravity of the article supported thereby and on the side of the center of gravity proximal to a vertical plane intermediate said retainers.

20. Dispensing mechanism as set forth in claim 17 wherein is provided anti-theft elements on said dividers positioned to engage the article of said pair of columns in the lowermost relative position and supported directly by one of said retainers for precluding substantial upward movement of the article from said supporting retainer.

21. Dispensing mechanism for controlling successive release of cylindrical articles alternately from adjacent front and rear columns of said articles, said mechanism comprising:
wall structure for confining the articles in said columns and arranged to direct the lowermost articles of the respective columns toward opposite sides of the structure;
a releasable retainer underlying each column;

a swingable gate disposed above said retainers and extending substantially from the front of the front column to the rear of the rear column for supporting the lowermost article in one column while the lowermost article in the other column is supported by its respective retainer, said gate being located to be driven by the weight of the articles in said one column to a supporting position for the next to lowermost article in the other column when the lowermost article of the latter is released by said retainer and as said one column drops to be supported by its respective retainer;

a circular latch having latching components equally spaced adjacent the periphery thereof and a series of equally spaced teeth in said periphery, said latch being rotatable about its axis in successive increments to cause said latching components to alternately latch and release each of the retainers and latch one while releasing the other;

reciprocable driving means for said latch successively engageable with said teeth in the periphery thereof for rotating said latch through said increments whereby said retainers are alternately released; and reciprocable lowering means normally in blocking disposition to both retainers, said lowering means receiving a retainer upon release thereof by said latch and operable to lower the same to release the article supported thereon and thereafter to return the released retainer.

22. Article dispensing mechanism comprising:

magazine structure for receiving and confining two upright columns of articles in disposition for gravitational delivery of articles from the lower extremity of each column;

an article support and release assembly operably associated with said structure for maintaining the lowermost article of one column alternately above and below the lowermost article of the other column and operable successively to release the lowermost article of said columns while retaining all other articles in said columns, said assembly including a releasable retainer located below each column respectively in normal disposition to alternately support the lowermost article of said columns;

a circular latch having latching components equally spaced adjacent the periphery thereof and rotatable about its axis in successive increments to cause said latching components to alternately latch and release each of the retainers and latch one while releasing the other; and reciprocable driving means for said latch successively engageable therewith for rotating said latch through said increments whereby said retainers are alternately released.

References Cited by the Examiner

UNITED STATES PATENTS

| | | | |
|---|---|---|---|
| 2,438,502 | 3/1948 | Holt | 221—118 X |
| 2,443,376 | 6/1948 | Case | 221—16 |
| 2,762,524 | 9/1956 | Johnson | 221—67 |
| 2,835,409 | 5/1958 | Rankin | 221—67 |
| 2,878,961 | 3/1959 | Voorhees et al. | 221—16 |
| 3,104,779 | 9/1963 | Denzer | 221—67 X |
| 3,107,030 | 10/1963 | Taylor | 221—116 |
| 3,107,812 | 10/1963 | Payne et al. | 221—67 |
| 3,118,567 | 1/1964 | Newberry | 221—6 X |
| 3,125,245 | 3/1964 | Newberry | 221—114 |

FOREIGN PATENTS

| | | |
|---|---|---|
| 844,600 | 8/1960 | Great Britain. |
| 853,048 | 11/1960 | Great Britain. |
| 921,856 | 3/1963 | Great Britain. |

LOUIS J. DEMBO, *Primary Examiner.*

KENNETH N. LEIMER, RAPHAEL M. LUPO,
*Examiners.*